Patented Jan. 8, 1935

1,987,526

UNITED STATES PATENT OFFICE

1,987,526

HIGH MOLECULAR ALIPHATIC SULPHIDES, AND PROCESS OF PRODUCING SAME

Eberhard Elbel and Alfred Kirstahler, Dusseldorf, Germany, assignors to Henkel & Cie., G. m. b. H., Dusseldorf, Germany No Drawing. Application January 23, 1933, Serial No. 653,175. In Germany February 19, 1932

15 Claims. (Cl. 260—112)

It is already known to allow mercaptans to react with halogen-containing aliphatic compounds, one component being also previously substituted by carboxyl groups. Heretofore, however, only lower aliphatic or mixed aromatic-aliphatic compounds of no technical importance have been concerned.

It has now been found that technical valuable sulphides of higher organic compounds, which sulphides possess a saponaceous character, may be obtained when aliphatic mercaptans are allowed to act upon halogen-containing compounds of the aliphatic series, at least one of the components having 5 or more carbon atoms.

According to one form of carrying out the process according to the invention, the high molecular aliphatic sulphides having a saponaceous character are obtained by allowing aliphatic mercaptans to react upon aliphatic compounds containing exchangeable halogen, at least one of the components containing one or more carboxyl groups or their derivatives, and at least one of the components possessing 5 or more carbon atoms.

The said compounds may be obtained in the first place by allowing halogen-containing compounds of the aliphatic series to react with mercapto-fatty acids.

Another form of carrying out the process according to the present invention is to allow aliphatic mercaptans to react with halogen-fatty acids.

Ethyl chloride, octyl chloride, dodecyl chloride, chloracetic acid, chlorobutyric acid and the like may be employed, for example, as halogen-containing aliphatic compounds.

As mercaptans, it is possible to employ for example: Mercapto-acetic acid, mercapto-butyric acids and the like, furthermore decyl mercaptan, dodecyl mercaptan, hexyl mercaptan, ethyl mercaptan and their mixtures.

The reaction components enumerated in the foregoing may also be substituted by groups of any kind, provided they do not influence the reaction unfavourably. Such groups are, for example: ether groups, carboxyl groups, sulphogroups and the like. Also polyvalent mercaptans, and polyhalogen compounds may be employed with equal success.

The new compounds possess saponaceous and emulsifying properties. They may be employed, inter alia, as auxiliary substances in the rubber industry, also in the pharmaceutical industry, etc. They also serve as starting substances for further conversion products.

*Example 1.*—23 parts of sodium metal are dissolved in 800 parts of absolute methanol, and 202 parts of dodecyl mercaptan are added to the solution. After a further addition of 122.5 parts of ethyl chloracetate, the separation of NaCl begins at once. The reaction is brought to completion by boiling for two hours. After removal of the separated NaCl, the mixture is saponified with excess of alcoholic caustic soda solution by boiling for one hour, whereupon the excess of alkali is neutralized with hydrochloric acid. After repeated filtration of the hot solution, and cooling of the filtrate, sodium S-dodecyl-thioglycolate is obtained as a white crystalline mass.

*Example 2.*—50 parts by weight of dodecyl-mercaptan-1 are dissolved in a mixture of 30 parts by weight of caustic soda solution (32 per cent.) and 225 parts by weight of ethyl alcohol (95 per cent.). The solution is mixed with a solution of 23.75 parts by weight of monochloracetic acid and 30 grams of caustic soda solution (32 per cent.) in 230 parts by weight of water, and the mixture is heated to boiling for one hour. After cooling, a snow-white crystalline mass separates out, which is filtered and is re-crystallized from alcohol. The mother liquor is evaporated to dryness and extracted with alcohol, a further small portion of the new compound being thus obtainable. An excellent yield of the sodium salt of (dodecyl-1-mercapto)-acetic acid is obtained.

*Example 3.*—To a solution of 8.1 parts of NaOH (99.1 per cent.) in 150 parts of alcohol (95 per cent.) are added 9.2 parts of mercapto-acetic acid, the disodium salt separating out. A solution of 20.4 parts of α-chlor-n-dodecane in 30 parts of alcohol (95 per cent.) are then added, and the mixture is boiled for three hours under a reflux condenser. After evaporating down and cooling, the crystalline mass which separates out is filtered off and re-crystallized from alcohol. A further small portion of the compound may be obtained from the mother liquor. An excellent yield of the sodium salt of (n-dodecyl-mercapto)-acetic acid is obtained.

*Example 4.*—For preparing the sodium salt of α-(ethyl-mercapto)-stearic acid, 36.3 parts by weight of α-bromostearic acid are dissolved in about 200 parts by volume of alcohol (94 per cent.) and are mixed with a solution of 4 parts by weight of caustic soda in 100 parts by volume of alcohol (94 per cent.). To the mixture is added a solution prepared from 2.3 parts by weight of sodium metal in 80 parts by volume of alcohol (94 per cent.) and 6.2 parts by weight of ethyl mercaptan, and the mixture is boiled for about 8 hours under a reflux condenser on the water bath. After the usual treatment, the sodium salt of α-(ethyl-mercapto)-stearic acid is obtained in the form of a white crystalline powder.

According to a special form of carrying out the process, higher aliphatic sulphides of a saponaceous character may also be obtained by allowing halogen-containing hydrocarbons to react with mercaptans, the halogenized hydrocarbon containing at least 8 carbon atoms. It is also possible, however, to carry out the process by subjecting to the reaction aliphatic mercaptans containing at least 8 carbon atoms.

Particularly valuable compounds have been found to be those which are substituted by sulphonic acid groups in one of the two components. These compounds may be obtained by employing, as starting substances, such compounds as contain a sulphonic acid group, and converting them into sulphides in the manner specified. It is also possible, however, to carry out the process by introducing into the sulphides the sulphonic acid group by means of known sulphonating agents or by exchange reactions.

Other valuable compounds have been found to be those which, in either of the two components, are substituted by hydroxyl groups or contain double bonds.

*Example 5.*—20.2 parts of dodecyl mercaptan are dissolved in a solution of 4 parts of NaOH (99 per cent.) in 130 parts of alcohol and are mixed with a solution of 19.7 parts of sodium 1,2,3 chloropropanol sulphonate in 100 parts of water. The mixture obtained is kept boiling for 2 hours. After cooling, the sodium salt of the 3-dodecyl-mercapto-2-hydroxy-propyl-sulphonic acid separates out in white crystalline plates.

*Example 6.*—20.2 parts of dodecyl mercaptan are dissolved in a solution of 4 parts of NaOH (99 per cent.) in 62 parts of alcohol and are mixed with 8.05 parts of glycol-chlorhydrin. The solution obtained is kept boiling for 2 hours, sodium chloride separating out. The liquid is then filtered and the alcohol evaporated. The 2-(dodecyl-mercapto)-ethyl alcohol is left.

Instead of dodecyl mercaptan, a mixture of the higher aliphatic mercaptans, such as decyl, dodecyl, tetradecyl, hexadecyl mercaptans, may be allowed to react with glycol chlorhydrin. A mixture of the corresponding alkyl-(β-hydroxyethyl)-sulphides is then obtained.

*Example 7.*—20 parts by weight of NaOH are dissolved in 400 parts by volume of alcohol, and thereto are added 101 parts by weight of dodecyl mercaptan and, gradually, 55.2 parts by weight of α-monochlorhydrin. The mixture is then heated to boiling for 3 hours on the water bath, and is thereupon treated in the manner described in Example 2. The dodecyl-(β,λ-dihydroxypropyl)-sulphide obtained is in the form of a white crystalline mass with a melting point of 53° C.

Instead of dodecyl mercaptan, a mixture of the higher aliphatic mercaptans, such as octyl, decyl, dodecyl, tetradecyl, hexadecyl mercaptans may be allowed to react with α-monochlorhydrin. A mixture of the corresponding alkyl-(β,γ-dihydroxypropyl)-sulphides is then obtained.

We claim:—

1. The process for the manufacture of high molecular sulphides of the aliphatic series, characterized in that aliphatic mercaptans are allowed to react in an alkaline medium upon aliphatic compounds which contain exchangeable halogen and are not acid halides, where at least one component contains at least 8 carbon atoms and where the other component contains at least 2 carbon atoms.

2. The process for the manufacture of high molecular sulphides of the aliphatic series, characterized in that aliphatic mercaptans are allowed to react in an alkaline medium upon aliphatic compounds which contain exchangeable halogen and are not acid halides, where at least one component contains at least 8 carbon atoms and where the other component contains at least 2 carbon atoms and where at least one component is substituted by at least one group which does not have an unfavorable influence on the reaction.

3. The process for the manufacture of high molecular sulphides of the aliphatic series, characterized in that aliphatic mercaptans are allowed to react in an alkaline medium upon aliphatic compounds which contain exchangeable halogen and are not acid halides, where at least one component contains at least 8 carbon atoms and where the other component contains at least 2 carbon atoms and where at least one component contains at least one soap-forming acid group.

4. The process for the manufacture of high molecular sulphides of the aliphatic series, characterized in that aliphatic mercaptans are allowed to react in an alkaline medium upon aliphatic compounds which contain exchangeable halogen and are not acid halides, where at least one component contains at least 8 carbon atoms and where the other component contains at least 2 carbon atoms and where at least one component contains at least one hydroxy group.

5. The process for the manufacture of high molecular sulphides of the aliphatic series, characterized in that aliphatic mercaptans are allowed to react in an alkaline medium upon aliphatic compounds which contain exchangeable halogen and are not acid halides, where at least one component contains at least 8 carbon atoms and where the other component contains at least 2 carbon atoms and where at least one component contains at least one unsaturated carbon radical.

6. The process for the manufacture of high molecular sulphides of the aliphatic series, characterized in that aliphatic mercaptans are allowed to react in an alkaline medium upon aliphatic compounds which contain exchangeable halogen and are not acid halides, where at least one component contains at least 8 carbon atoms and where the other component contains at least 2 carbon atoms and where at least one component contains at least one carboxyl group.

7. The process for the manufacture of high molecular sulphides of the aliphatic series, characterized in that aliphatic mercaptans are allowed to react in an alkaline medium upon aliphatic compounds which contain exchangeable halogen and are not acid halides, where at least one component contains at least 8 carbon atoms and where the other component contains at least 2 carbon atoms and where at least one component contains at least one sulphonic acid group.

8. The process for the manufacture of high molecular sulphides of the aliphatic series, characterized in that aliphatic mercaptans are allowed to react in an alkaline medium upon halogen fatty acids, where at least one component contains at least 8 carbon atoms and the other component contains at least 2 carbon atoms.

9. The process for the manufacture of high molecular sulphides of the aliphatic series, characterized in that mercapto-fatty acids are allowed to react in an alkaline medium upon aliphatic compounds which contain exchangeable halogen and are not acid halides, where at least one component contains at least 8 carbon atoms and the other component contains at least 2 carbon atoms.

10. As a new product, the thioether of the general formula

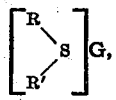

where R means an aliphatic radical containing at least 8 carbon atoms and R' means an aliphatic radical containing at least 2 carbon atoms and G means a soap-forming acid group combined with the radical R.

11. As a new product, the thioether of the general formula

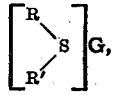

where R means an aliphatic radical containing at least 8 carbon atoms and R' means an aliphatic radical containing at least 2 carbon atoms and G means a soap-forming acid group combined with the radical R'.

12. As a new product, the thioether of the general formula

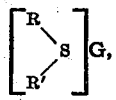

where R means an aliphatic radical containing at least 8 carbon atoms and R' means an aliphatic radical containing at least 2 carbon atoms and G means a hydroxy group combined with the radical R.

13. As a new product, the thioether of the general formula

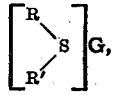

where R means an aliphatic radical containing at least 8 carbon atoms and R' means an aliphatic radical containing at least 2 carbon atoms and G means a hydroxy group combined with the radical R'.

14. As a new product, the thioether of the general formula R—S—R', where R means an unsaturated aliphatic radical containing at least 8 carbon atoms and R' means an aliphatic radical containing at least 2 carbon atoms.

15. As a new product, the thioether of the general formula R—S—R', where R means an aliphatic radical containing at least 8 carbon atoms and R' means an unsaturated aliphatic radical containing at least 2 carbon atoms.

EBERHARD ELBEL.
ALFRED KIRSTAHLER.